US00RE39509E

(19) United States
(12) Reissued Patent
Helms et al.

(10) Patent Number: US RE39,509 E
(45) Date of Reissued Patent: Mar. 13, 2007

(54) TOP ENTRY SUB ARRANGEMENT

(75) Inventors: Charles M. Helms, Danbury, TX (US); Charles W. Bleifeld, Pearland, TX (US)

(73) Assignee: Specialty Rental Tools & Supply, LP, Alvin, TX (US)

(21) Appl. No.: 10/300,451

(22) Filed: Nov. 20, 2002

Related U.S. Patent Documents

Reissue of:
(64) Patent No.: 5,284,210
Issued: Feb. 8, 1994
Appl. No.: 08/013,649
Filed: Feb. 4, 1993

(51) Int. Cl.
*E21B 19/08* (2006.01)
*E21B 23/00* (2006.01)

(52) U.S. Cl. ..... 166/385; 166/77.1; 166/77.2; 166/117.5; 166/379; 166/384

(58) Field of Classification Search ..... 166/385, 166/381, 382, 384, 117.5, 338–342, 75.11, 166/77.2, 77.3, 70, 379
See application file for complete search history.

(56) References Cited

U.S. PATENT DOCUMENTS 427,478 A * 5/1890 McEvoy ..... 285/3
1,209,869 A * 12/1916 Murphy ..... 285/132.1
3,139,932 A * 7/1964 Johnson ..... 166/368
3,346,045 A * 10/1967 Knapp et al. ..... 166/350
3,354,961 A * 11/1967 Pennington ..... 166/66.5
3,394,760 A * 7/1968 Childers et al. ..... 166/383
3,525,401 A * 8/1970 Hanson et al. ..... 166/383
3,599,711 A * 8/1971 Fowler ..... 166/335
3,773,062 A * 11/1973 McIver ..... 137/1
3,866,628 A * 2/1975 Weber et al. ..... 137/625.44
4,062,551 A * 12/1977 Base ..... 277/330
4,200,297 A * 4/1980 Tricon ..... 277/337
4,224,986 A * 9/1980 Rothberg ..... 166/117.5
4,252,149 A * 2/1981 Dollison ..... 137/625.44
4,388,969 A * 6/1983 Marshall et al. ..... 166/242.5
4,399,877 A * 8/1983 Jackson et al. ..... 175/45
4,506,729 A * 3/1985 Davis et al. ..... 166/66.5
4,524,834 A * 6/1985 Barron et al. ..... 166/385
4,681,162 A * 7/1987 Boyd ..... 166/242.5
4,976,314 A * 12/1990 Crawford et al. ..... 166/117.5

OTHER PUBLICATIONS

Boyd's Wireline Side Entry Sub shop drawings (ca. 1985).
Boyd's Side Entry Flyout or Short Boy shop drawings (ca. 1990).
Boyd's Wireline Side Entry Sub literature (ca. 1989).

* cited by examiner

*Primary Examiner*—Hoang Dang
(74) *Attorney, Agent, or Firm*—David B. Dickinson; Lundeen & Dickinson, LLP

(57) ABSTRACT

A top entry sub (ES) includes a tubular member (TM) with a main body section (8) and an enlarged external diameter upper end portion (11). A single passage (15) extends through the main body section (8) and terminates in a pair of spaced passages (14) and (14a) that extend through the enlarged external diameter end portion (11), which passages terminate in a common upper surface on the top entry sub (ES) for receiving a well string and providing an entry into the top entry sub for members such as coiled tubing, snubbing members and cable.

36 Claims, 2 Drawing Sheets

TOP ENTRY SUB ARRANGEMENT

Matter enclosed in heavy brackets [ ] appears in the original patent but forms no part of this reissue specification; matter printed in italics indicates the additions made by reissue.

STATEMENT OF THE PRIOR ART

The only above hole entry sub presently in use known to applicants is that shown in U.S. Pat. No. 4,681,162 which is a side entry sub for receiving only a wireline cable therethrough for use in freeing stuck pipe in a well bore.

However, so far as known to applicants there is no above hole top entry sub available to receive wireline or coiled tubing or to use in a snubbing operation. The side entry sub of the above referred to patent is used with a top drive power unit which is located above the working floor. Prior entry subs have generally been limited to use with wireline or other substantially flexible conduits of relatively small diameter because of the limited entry angle.

The side entry sub of the above patent requires that a standard 30 foot joint of pipe be connected to its upper end and also to the lower end of the sub. The wireline is generally fed through the side entry opening and necessary tools for freeing the stuck pipe are then connected to the wireline that projects from the lower end of the tool joint that is connected to and extends from the bottom of the sub as shown in FIG. 3 of the drawings. This set-up operation is time consuming and expensive.

When the operation is complete, the tool joint is unscrewed from the drill string and the analytical tools disconnected from the wireline so it can be withdrawn from the side entry port.

Also, the above side entry port cannot be employed with coiled tubing and cannot be employed in snubbing operations.

The present invention overcomes the above and other problems and limitations of current side entry above hole subs.

SUMMARY OF THE INVENTION

The present invention provides a top entry sub which is adapted to be received and supported in a rotary table that is normally positioned at or adjacent working floor level, or it can be employed with a top drive power unit.

It includes a tubular member having a top surface which is provided with dual openings in which a well string, such as a drill string, may be connected in one opening and is provided with a second opening through which another pipe or conduit may be inserted into the well string.

The sub of the present invention may be connected directly to the well string, such as a drill string, extending up from the rotary table and a wireline with the analytical tools connected thereto extended through the top entry port. This eliminates the need for 30 foot pipe joints connected above and below the sub to enable a wireline and its tools to be stepwise connected as above described with regard to U.S. Pat. No. 4,681,162.

Coiled tubing may be inserted through the opening with the shaped flange and drill or well string may be connected through the other opening.

The sub of the present invention can be employed in snubbing operations.

One object of the present invention is to provide a top entry sub to provide an entry angle to accommodate coiled tubing, tubular members or the like, as well as small diameter members such as wireline conduit and the like to be inserted through the sub and into the well string.

Another object of the present invention is to provide a universal entry sub which employs a top entry for inserting various size and type objects in a well string and reduces the problems encountered with side entry subs presently in use.

A still further object is to provide an entry sub for use with in snubbing operations in a well bore.

Other objects and advantages of the present invention will become apparent from a consideration of the following description and drawings.

DESCRIPTION OF THE PREFERRED EMBODIMENTS

Figure 1:
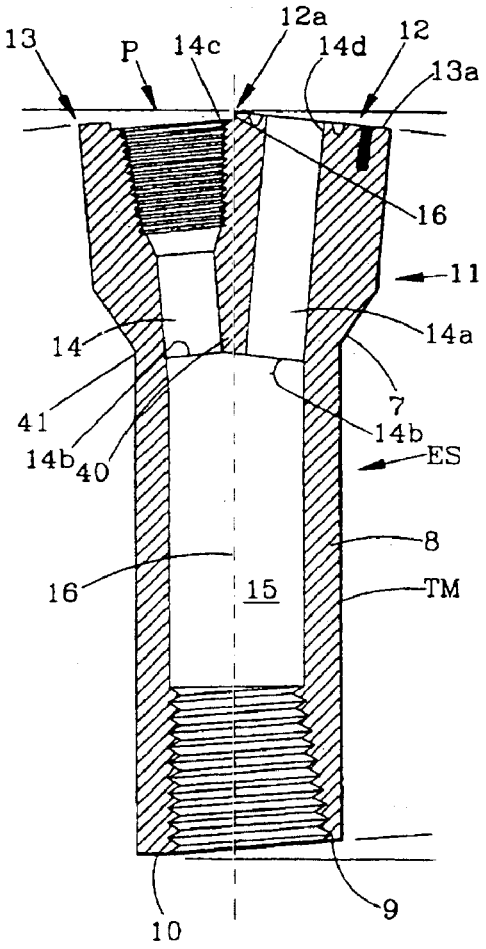
FIG. 1 is one-half sectional view of a preferred embodiment of the present invention.

Attention is first directed to FIG. 1 wherein the top entry sub ES of the present invention is shown as including a tubular member, referred to generally at TM having a main body section 8 with a lower end 9 with a lower end surface 10 thereon.

An enlarged external diameter upper end portion referred to generally at 11, extends upwardly from the main body section 8 of the tubular member. The enlarged upper end portion 11 has an upper end represented generally at 12 with an upper surface thereon shown generally at 12a.

In the FIG. 1 form of the top entry sub of the present invention, a single passage 15 extends through the main body section 8 which passage 15 is co-axial with the center line 16 of the main body section 8, as shown, and extends substantially the extent of the main body section 8 as shown in the drawings.

An upper pair of spaced, passages 14 and 14a are provided in upper end portion 11 and are inclined outwardly and upwardly relative to the centerline axis 16 of the main body section 8 as shown.

The passages 14, 14a extend through the annular, enlarged diameter upper end portion 11 from their respective lower ends 14b which lower ends communicate with the upper end of single passage 15 in the main body section 8 as shown in the drawings. The passages 14 and 14a each terminate at their upper end in openings 14c, 14d, respectively, in the upper surface 12a of enlarged end portion 11 as shown.

The enlarged portion 11 includes an inclined, outer annular surface 7 adjacent its lower end at its juncture with the main body section 8, which annular surface helps to support the top entry sub ES in a rotary table as will be explained.

In the preferred embodiment, the inner diameter of the passage 15 is as large or larger than the combined inner diameters of passages 14 and 14a. One preferred internal diameter range for the passage 15, by way of example only and not by way of limitation is from 4¼ inches to 5¾ inches and a preferred range of passage 14, by way of example only, and not by way of limitation is 1 inch to 4¾ inches, while a preferred range for passage 14a, by way of example only, and not by way of limitation is 2 inches to 3½ inches.

In the FIG. 1 form, the upper surface 12a is formed by two surfaces 13 and 13a each of which is inclined outwardly and downwardly from the intersection of the centerline 16 of the tubular member TM with a lateral plane, represented generally at P that is perpendicular to and intersects the centerline 16 at the uppermost end of the enlarged end portion of tubular member TM as better seen in FIG. 1. The degree of inclination of each surface 13, 13a is preferably in the range of approximately five to seven degrees from the hypothetical lateral plane that is perpendicular to and intersects the centerline 16 at the upper surface 12 as above described.

The preferred angle of inclination of each surface 13, and 13a is approximately five and one half degrees. The passage 14 is internally threaded adjacent its upper end to form a box connection and receives the well string (not shown) which is provided with external threads to be engaged therein. The lower end surface 9 and lower surface 10 of main body section 8 is inclined in a manner and preferably at substantially the same angle as upper surface 13 as shown in FIG. 1 so that it is parallel thereto. This provides a better alignment between the portion of well pipe, such as drill pipe DP, that is connected into passage 14 adjacent its upper end and the portion of the drill pipe that is connected with the lower end of a sub, such as cross over sub 20.

Figure 4:
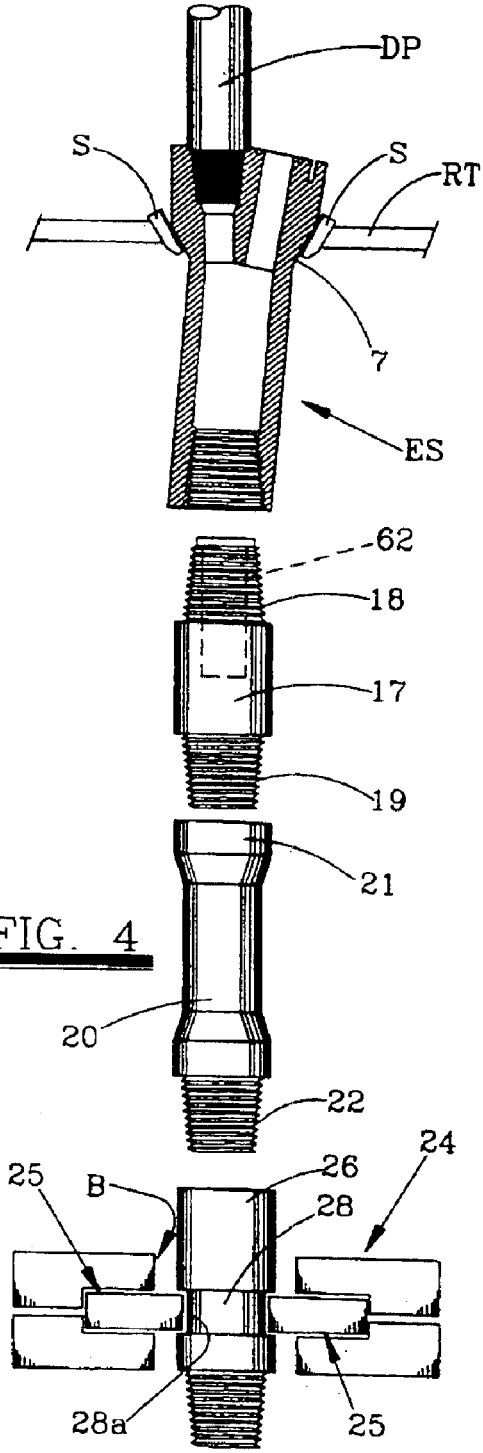
FIG. 4 shows the FIG. 1 form received in a rotary table and other components of the invention which may be employed therewith.

The passage 14a has a smooth internal bore, preferably throughout its extent for receiving coiled tubing, wireline and tools connected therewith or members used in snubbing operations. This main body section 8 is internally threaded adjacent its lower end as shown to receive a connection, or double pin sub, represented at 17 in FIG. 4 having external threads 18 at its upper end for engaging with the internal threads adjacent the lower end of main body section 8. The lower end of sub 17 is also provided with external threads 19 for engaging with other components which are employed therewith, for example, as illustrated in FIG. 4.

The two passages 14 and 14a are spaced by the longitudinal portion 40 which is shown as extending internally in the top entry sub from approximately adjacent the beginning 41 of the enlarged end portion 11 to the upper end 12 of the tubular member TM. Its longitudinal extent is maintained at a minimum as shown in the drawings in relation to the longitudinal extent of the single passage 15 in main body section 8 to provide maximum clearance for entry of coiled tubing and tubular members and to decrease the angle of entry of any object through passage 14a into the single passage of the main body section.

Figure 2:
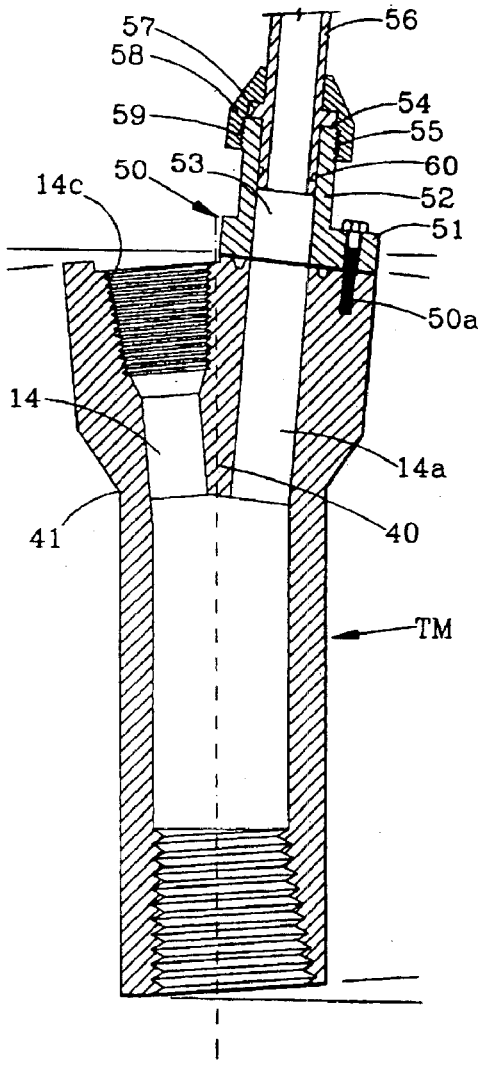
FIG. 2 is one half sectional view similar to FIG. 1 with a flange secured thereon.

FIG. 2 illustrates one preferred arrangement for use with coiled tubing and tubulars used in snubbing operations. A flange 50 includes a partially annular shaped base 51, in that it has a portion of the base cut off, so that the base is "D" shaped. This is necessary so that the base 51 does not interfere with access to opening 14c. The flange 50 also includes a tubular portion 52 extending up from base 51 with passage 53 therein. The tubular portion 53 terminates in upper end 54, and external threads 55 are provided on portion 53 adjacent the upper end 54 thereon as shown in FIG. 2. The flange 50 may be removably secured in position on the upper surface 13a by any suitable means such as bolt 50a extending through base 51 into the enlarged upper end as shown.

An adapter 56 is provided with an annular projection or shoulder 57 which seats on the upper end 54 of tubular portion 52, and a coupling 58 with internal threads 59 removably secures adapter 56 with tubular portion 52 as shown. A seal 60 is provided between the adapter and tubular portion as shown in FIG. 2.

Figure 5:
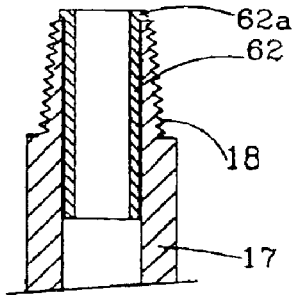
FIG. 5 is a plan view of a wear sleeve which may be employed with the present invention.

When cable or wireline is to be run in the passage 14a of the tubular member TM, the double pin sub 17 and the crossover sub 20, may be employed with the entry sub. A wear sleeve 62 is shown in FIG. 5 for use with the double pin sub 17 which includes an upper edge 62a for receiving on the upper end of the sub 17 as illustrated in FIG. 5 and shown in dotted line in FIG. 4. During entry of cable through passage 14a, there may be a tendency to form a groove at the upper end of the sub 17. By manually rotating the sleeve 62 periodically, the wear is more evenly distributed which increase the useful life of the sleeve 62.

When coiled tubing is to be run through the top entry sub, or where a snubbing operation which employs tubular members is to be run through the passage 14a of the top entry sub ES, an arrangement including preferably all of the components as shown in FIG. 4 may be employed. A cross over sub 20 is employed when it is necessary or desirable to connect two tubular members together having different internal diameters or different thread forms. Cross over sub 20 is shown as having a box end, or internally threaded upper end 21, and an externally threaded lower end, or pin end 22, however it may have a double box or double pin connection as previously referred to herein.

Blow out preventers such as represented schematically at 24 in FIG. 4 are generally employed in well operations where the well pressure requires their use, or as a safety measure to prevent pressure surges from disrupting operations. The structure, locations, or positioning and operation of blowout preventers is well known to those skilled in the art and no detail explanation is deemed necessary. Blow out preventers include a longitudinal bore B and opposed rams represented schematically at 25 which are movable laterally of the longitudinal bore in a manner well known to engage around pipe. The rams are configured to perform selected operations such as cutting the pipe, shutting off flow from the formation between the producing string and the well bore, or locking with the well pipe, such as a drill string to prevent movement thereof in response to downhole pressure. In the present situation, the inner ends of the rams are concave to fit around the annular surface 28 on the sub 26 and the rams 25 are provided with seals on their concave inner ends, in a manner well known in the art, to seal with the bottom annular surface 28a of the groove 28. The sub 26, which may be termed a securing sub, is provided to connect with a sub, such as the cross over sub 20 and is provided with an external threaded end, or pin end, for connecting with the well string portion which well string portion extends there from and into the well bore (not shown). The blow out preventer 24 is generally spaced beneath the rotary table represented schematically at RT, and the rotary table is normally at the working floor level of the work over rig or derrick. The length of the double pin sub 17, cross over sub 20 and securing sub along with the length of the top entry sub ES is planned so that when the top entry sub ES is positioned in the rotary table represented generally at RT the annular groove 28 in the outer surface of the sub 26 is aligned with the rams 25 as shown in FIG. 4. The structure and function of the rotary table RT is well known to those skilled in the art and it is believed no detail explanation is necessary. It is provided with an annular bowl which acts a support for arcuate segmented slips represented schematically at S in FIG. 4 that have a serrated inner surface which engage the tapered annular surface 7 and hold the top entry sub ES in position in the rotary table. The rotary table is connected with a power source in a well known manner which imparts rotation to the rotary table RT and top entry sub ES therein along with the well string, or drill string which is connected in the opening 14b at the upper end of the top entry sub ES and the depending drill string portion (not shown) connected with the internal threads in the lower end of passage 15.

In an emergency, the blow out preventer 26 is actuated in a manner well known in the art to move the rams 25 to sealably engage their inner ends with the annular bottom surface 28a in the annular groove 28 and restrict or prevent movement of the drill string in the well bore in response to pressure.

Figure 3:
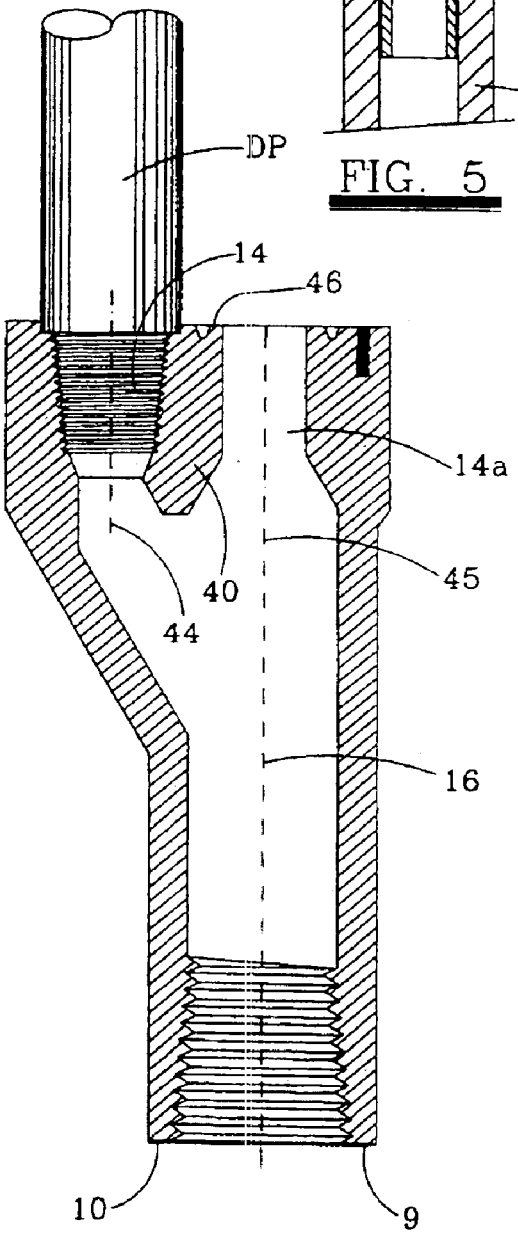
FIG. 3 is a one half sectional view of an alternate embodiment.

FIG. 3 illustrates an alternate embodiment wherein the center lines, represented at 44 and 45 of each passage 14 and 14a are parallel. The top surface, represented at 46 in this form, is flat as shown and the centerline of passage 14a is coincident with the centerline 16 of the main body section 8. The well string is connected in the upper end of passage 14, and the entry passage 14a is provided for receiving coiled tubing, snubbing tubulars, and wireline as described with regard to FIG. 1.

The foregoing disclosure and description of the invention are illustrative and explanatory thereof, and various changes in size, shape and materials as well as in the details of the illustrated construction may be made without departing from the spirit of the invention.

What is claimed is:

1. A top entry sub including:

a *single* tubular member;

said tubular member having a main body section with a lower end and an enlarged external diameter upper end portion;

an upper surface on said enlarged external diameter upper end portion;

a lower surface on said lower end;

a single longitudinal passage in said main body section extending through said tubular member lower end; [and]

said single longitudinal passage terminating at its upper end in two spaced passages extending through said enlarged external diameter upper end portion and upper surface thereon*;*

*said spaced passages spaced apart by a longitudinal member and in simultaneous unobstructed communication with said single longitudinal passage; and*

*wherein the extent of said longitudinal member through said upper end portion is less than the extent of said single longitudinal passage through said main body section.*

2. The top entry sub of claim 1 wherein said upper surface on said enlarged external diameter upper end portion is perpendicular to the center line of said tubular member.

3. The top entry sub of claim 2 wherein the center line of said two spaced passages are parallel.

4. [The top entry sub of claim 1] *A top entry sub including:*

*a single tubular member;*

*said tubular member having a main body section with a lower end and an enlarged external diameter upper end portion;*

*an upper surface on said enlarged external diameter upper end portion;*

*a lower surface on said lower end;*

*a single longitudinal passage in said main body section extending through said tubular member lower end;*

*said single longitudinal passage terminating at its upper end in two spaced passages extending through said enlarged external diameter upper end portion and upper surface thereon;*

*said spaced passages spaced apart by a longitudinal member;*

*wherein the extent of said longitudinal member through said upper end portion is less than the extent of said single longitudinal passage through said main body section; and* wherein said upper surface on said enlarged external diameter upper end portion is formed by two surfaces which are inclined outwardly and downwardly from the center line of said tubular member.

5. The top entry sub of claim [1] *4* wherein said two surfaces forming said upper surface are each inclined outwardly and downwardly in the range of approximately five to seven degrees from a plane perpendicular to the center line of said tubular member.

6. The top entry sub of claim [1] *4* wherein said lower surface is inclined so that it is substantially parallel to one of said two upper surfaces.

7. [The top entry sub of claim 1 including] *A top entry sub including:*

*a single tubular member;*

*said tubular member having a main body section with a lower end and an enlarged external diameter upper end portion;*

*an upper surface on said enlarged external diameter upper end portion;*

*a lower surface on said lower end;*

*a single longitudinal passage in said main body section extending through said tubular member lower end;*

*said single longitudinal passage terminating at its upper end in two spaced passages extending through said enlarged external diameter upper end portion and upper surface thereon;*

*said spaced passages spaced apart by a longitudinal member;*

*wherein the extent of said longitudinal member through said upper end portion is less than the extent of said single longitudinal passage through said main body section;* a sub having an upper end and a lower end;

threads adjacent said upper end for connection with said lower end of said tubular member; and threads adjacent said lower end.

8. [The] *A* top entry sub [of claim 7] including*:*

*a tubular member;*

*said tubular member having a main body section with a lower end and an enlarged external diameter upper end portion;*

*an upper surface on said enlarged external diameter upper end portion;*

*a lower surface on said lower end;*

*a single longitudinal passage in said main body section extending through said tubular member lower end;*

*said single longitudinal passage terminating at its upper end in two spaced passages extending through said enlarged external diameter upper end portion and upper surface thereon;*

*a sub having an upper end and a lower end;*

*threads adjacent said upper end for connection with said lower end of said tubular member; and threads adjacent said lower end; and* a cross over sub having a threaded upper end and a threaded lower end.

9. The top entry sub to claim 8 for use with a blow out preventer with rams to maintain a well string in position in a well bore including a securing sub having a threaded surface for connecting with said threaded lower end of said cross over sub, a threaded connection depending from said securing sub for connection with the well string and an annular groove in said securing sub for receiving the blow-out preventer rams therein to maintain said well string in position in the well bore.

10. [The] *A* top entry sub [of claim 1] *including:*

*a tubular member;*

*said tubular member having a main body section with a lower end and an enlarged external diameter upper end portion;*

*an upper surface on said enlarged external diameter upper end portion;*

*a lower surface on said lower end;*

*a single longitudinal passage in said main body section extending through said tubular member lower end;*

*said single longitudinal passage terminating at its upper end in two spaced passages extending through said enlarged external diameter upper end portion and upper surface thereon;*

*a sub having an upper end and a lower end;*

*threads adjacent said upper end for connection with said lower end of said tubular member; and threads adjacent said lower end; and* wherein said enlarged external diameter upper end portion is provided with a surface configuration for being received and supported in a rotary table.

11. The top entry sub of claim 1 including a flange having an opening therein coinciding with one of said two spaced passages in said upper surface and means to removably secure said flange to said upper surface.

12. The top entry sub of claim 11 wherein:

said flange includes a base;

a tubular portion extending upwardly around said opening in said base; and said tubular portion terminating in an upper end.

13. [The top entry sub of claim 12 including] *A top entry sub including:*

*a single tubular member;*

*said tubular member having a main body section with a lower end and an enlarged external diameter upper end portion;*

*an upper surface on said enlarged external diameter upper end portion;*

*a lower surface on said lower end;*

*a single longitudinal passage in said main body section extending through said tubular member lower end;*

*said single longitudinal passage terminating at its upper end in two spaced passages extending through said enlarged external diameter upper end portion and upper surface thereon;*

*said spaced passages spaced apart by a longitudinal member; and*

*wherein the extent of said longitudinal member through said upper end portion is less than the extent of said single longitudinal passage through said main body section;*

*a flange having an opening therein coinciding with one of said two spaced passages in said upper surface and means to removably secure said flange to said upper surface;*

*said flange includes a base;*

*a tubular portion extending upwardly around said opening in said base;*

*said tubular portion terminating in an upper end; and* an adapter, and means for removably engaging said adapter with said tubular portion.

14. The top entry sub of claim [12] *13* wherein said means for removably engaging said adapter with said tubular portion includes:

an external threaded surface adjacent said upper end of said tubular portion;

an external projection on said adapter for abutting with said tubular portion upper end; and a coupling with internal threads for threadably engaging with said external threads on said tubular portion to secure said adapter in position with said tubular portion and: a seal between said adapter and said tubular portion.

15. The top entry sub of claim 10 wherein said surface configuration is an annular tapered external surface adjacent the lower end of said enlarged external diameter upper end portion.

16. A top entry sub including:

a *single* tubular member;

said tubular member having an upper end;

said tubular member having a lower end;

a longitudinal passage extending in said tubular member and through said tubular member lower end; [and]

said longitudinal passage terminating at two spaced inclined passages which extend through the upper end of said tubular member*;*

*said two spaced inclined passages spaced apart by a longitudinal member and in simultaneous unobstructed communication with said longitudinally passage; and*

*wherein the extent of said longitudinal member through said upper end is less than the extent of said single longitudinal passage through said tubular member.*

17. A method of inserting coiled tubing in a tubular well string through [a] *the* top entry sub [that has a longitudinal passage that extends through the the lower end of the top entry sub, which passage communicates at its upper end with at least two inclined passages that extend through the upper end of the top entry sub] *of claim 16* including the steps of:

securing the top entry sub to connect its longitudinal passage with the tubular well string; and inserting the coiled tubing in one of the inclined passages in the upper end of the top entry sub and through the longitudinal passage into the well string.

*18. A universal top entry sub for inserting necessary tools of various size, type and flexibility for freeing stuck pipe in a well bore, comprising:*

*a single tubular member;*

*said tubular member having a main body section with a lower end and an enlarged external diameter upper end portion;*

*an upper surface on said enlarged external diameter upper end portion;*

*a lower surface on said lower end;*

*a single longitudinal passage in said main body section extending through said tubular member lower end;*

*said single longitudinal passage terminating at its upper end in two passages spaced apart by a longitudinal member;*

*said spaced passages and said longitudinal member extending through the enlarged external diameter upper end portion and to the upper surface thereon;*

*wherein the extent of said longitudinal member through said upper end portion is less than the extent of said single longitudinal passage through said main body section; and*

*said single longitudinal passage in simultaneous unobstructed communication with said two spaced passages.*

*19. The universal top entry sub of claim 18 wherein the single longitudinal passage includes a longitudinal bore having an upper end adjacent to lower ends of the two spaced passages.*

*20. The universal top entry sub of claim 19 wherein the longitudinal member has a transverse surface at the upper end of the bore.*

*21. The universal top entry sub of claim 18 wherein the single longitudinal passage terminates near the enlarged external diameter upper end portion.*

*22. The universal top entry sub of claim 18 wherein the single longitudinal passage has a larger internal diameter than each of the two spaced passages.*

*23. The universal top entry sub of claim 22 wherein the internal diameter of the single passage is as large or larger than the combined inner diameters of the two spaced passages.*

*24. The universal top entry sub of claim 22 wherein the single passage has an internal diameter from 4.25 to 5.75 inches, a first one of the spaced passages has an internal diameter of from 1 to 4.75 inches, and a second one of the spaced passages has an internal diameter from 2 to 3.5 inches.*

*25. The universal top entry sub of claim 22 wherein at least one of the spaced passages has a smooth internal diameter.*

*26. The universal top entry sub of claim 25 wherein the smooth internal bore is throughout the extent of the respective spaced passage.*

*27. The universal top entry sub of claim 18 wherein the extent of the longitudinal member is less than about half that of the single passage.*

*28. The universal top entry sub of claim 18 wherein the single longitudinal passage is internally threaded adjacent the lower end.*

*29. The universal top entry sub of claim 18 wherein the two spaced passages are inclined outwardly and upwardly with respect to a centerline axis of the main body section.*

*30. A universal top entry sub for inserting necessary tools of various size and type for freeing stuck pipe in well bore, comprising:*

*a tubular member;*

*said tubular member having a main body section with a lower end and an enlarged external diameter end portion;*

*at least one upper surface on said enlarged external diameter upper end portion;*

*a lower surface on said lower end;*

*a single longitudinal passage in said main body section extending through said tubular member lower end, said passage having an internal diameter from 4.25 to 5.75 inches and internal threads at a lower end thereof;*

*said single longitudinal passage having a bore terminating at its upper end in two spaced passages extending through said enlarged upper end portion and upper surface thereon, one of said two spaced passages comprising a well string connection and having an internal diameter from 1 to 4.75 inches, the other of said two spaced passages comprising an entry port and having an internal diameter from 2 to 3.5 inches, the bore of the single passage having an internal diameter larger than internal diameters of each of the two spaced passages;*

*a longitudinal member between the two spaced passages having a lower transverse surface at a top of the bore, said longitudinal member having a longitudinal extent between the single longitudinal passage and the upper surface relatively less than the longitudinal extent of the single longitudinal passage between the lower surface and the longitudinal member; and*

*said two spaced passages in simultaneous unobstructed communication with said single longitudinal passage.*

*31. A universal top entry sub for inserting necessary tools of various size and type for freeing stuck pipe in well bore, comprising:*

*a tubular member;*

*said tubular member having an upper end;*

*a longitudinal passage extending in said tubular member and through said tubular member lower end;*

*said longitudinal passage including a bore terminating at two spaced inclined passages which extend through the upper end of said tubular member;*

*a longitudinal member between the inclined passages having a lower transverse surface at a top of the bore, an extent of the longitudinal member between the two spaced passages relatively less than a longitudinal extent of the longitudinal passage; and*

*said spaced inclined passages in simultaneous unobstructed communication with said longitudinal passage.*

*32. The universal top entry sub of claim 31 wherein the longitudinal passage has a larger internal diameter than each of the two spaced inclined passages.*

*33. The universal top entry sub of claim 32 wherein the internal diameter of the longitudinal passage is as large or larger than the combined inner diameters of the two spaced inclined passages.*

*34. The top entry sub of claim 31 wherein at least one of the spaced inclined passages has a smooth internal bore.*

*35. The top entry sub of claim 34 wherein the smooth internal bore is throughout the extent of the at least one of the spaced inclined passages.*

*36. A universal top entry sub for inserting necessary tools of various size and type for freeing stuck pipe in well bore, comprising:*

*a tubular member;*

*said tubular member having an upper end;*

*a longitudinal passage extending in said tubular member and through said tubular member lower end;*

*said longitudinal passage including a bore terminating at two spaced inclined passages which extend through the upper end of said tubular member;*

*a longitudinal member between the inclined passages having a lower transverse surface at a top of the bore, an extent of the longitudinal member between the two spaced passages relatively less than a longitudinal extent of the longitudinal passage; and*

*wherein the single passage has an internal diameter from 4.25 to 5.75 inches, a first one of the spaced inclined passages has an internal diameter from 1 to 4.75 inches, and a second one of the spaced inclined passages has an internal diameter from 2 to 3.5 inches.*

* * * * *